March 20, 1928.  1,662,898
A. T. PURSELL
LINER FOR CITRUS FRUIT JUICE EXTRACTORS
Filed Nov. 26, 1923  2 Sheets-Sheet 1
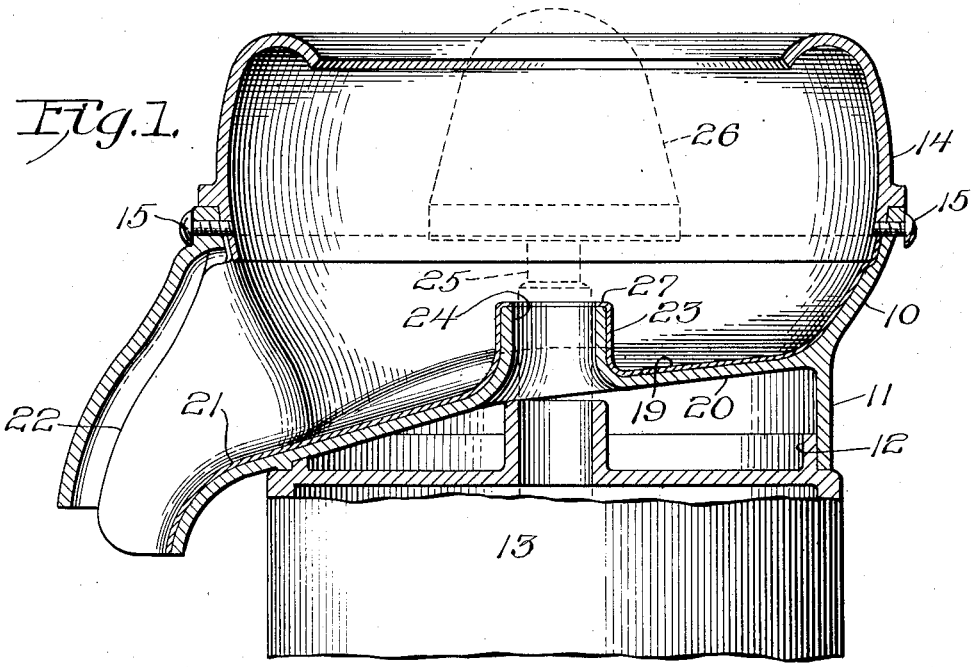
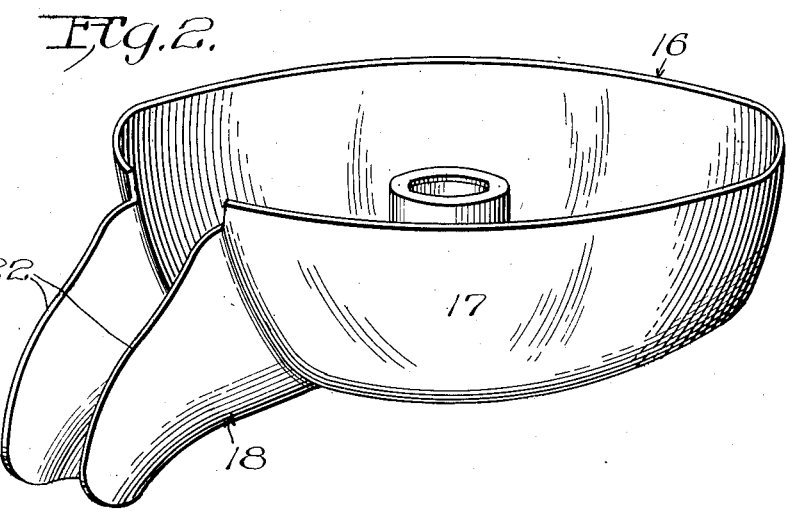
Inventor
Arthur Todd Pursell
by
Atty.

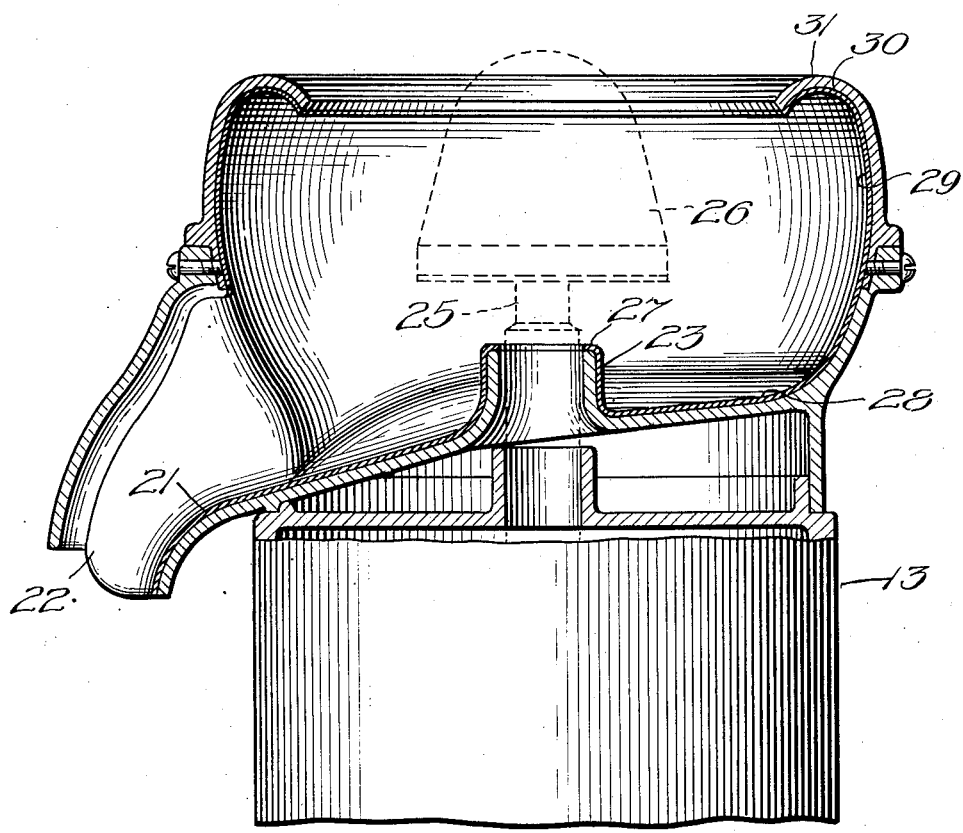

Patented Mar. 20, 1928.

1,662,898

UNITED STATES PATENT OFFICE.

ARTHUR TODD PURSELL, OF CHICAGO, ILLINOIS, ASSIGNOR TO ARNOLD ELECTRIC COMPANY, OF RACINE, WISCONSIN, A CORPORATION OF WISCONSIN.

LINER FOR CITRUS-FRUIT-JUICE EXTRACTORS.

Application filed November 26, 1923. Serial No. 677,195.

This invention relates to improvements in citrus fruit juice extractors, and refers more particularly to a liner for the bowl and discharge spout of such extractors and to the combination with such a bowl of an economical and readily installed and detachable liner member for the bowl and discharge spout thereof, to prevent contact of the juices of the fruit from contact with the metal wall of the bowl and spout, and the deleterious or corrosive action of the acid of such juices with the metal.

Heretofore it has been a common practice in the manufacture of fruit extractors of the general type herein shown, to make the bowl of china ware, or like wear, or of metal coated with porcelain. The frangibility of china and like wear in a bowl of this character, subject to rough usage, is an objection because such bowls are frequently broken and are expensive to replace. As a result of the danger of breaking bowls of this character, the person in charge of the extractor will allow the bowl to become foul and unsanitary, rather than take the risk of breaking it on removal.

In the use of a porcelain coated metal bowl, it has been found that the acid of the fruit juices quickly destroy or corrode the lining so as to bring the juices directly into contact with the metal body of the bowl and its discharge spout. After the lining of such a metal bowl has thus been partially destroyed, it cannot be safely further used because of the injurious effect of corroding the metal and mixing it with the juices.

In order to overcome these disadvantages, it is proposed by the present invention to provide, in combination with a non-breakable metal bowl and spout, an economical and readily insertable and removable liner which covers that part of the bowl and spout along which the juices extracted from the fruit flow to a receiving receptacle placed beneath the spout. Such liner is made of material that is liquid proof and neutral to the acid of the fruit juices and which can be used over a substantial period of time before it is necessary to remove it for replacement by an unused liner. Such material may be a paraffined paper formed up into suitable shape to fit the contour of the bowl bottom and sides and the spout, as well as also the usual upstanding guard for the extracting bulb shaft. The liner will be of such weight or gauge that the wall thereof will be strong enough to hold its shape.

In the embodiment of the invention shown in the drawing,—

Fig. 1 is a vertical sectional view of a fruit extractor bowl and its spout, showing the standard or body partially in elevation and the rotary extractor in dotted lines.

Fig. 2 is a perspective view of the liner removed from the bowl.

Fig. 3 is a view similar to Fig. 1 showing a modification.

The bowl herein shown is of the type illustrated in my copending application for United States Letters Patent Serial No. 653,033, filed July 21, 1923. Said bowl comprises a lower member 10, having a depending neck 11 that fits over and may be attached in any suitable manner to an upstanding rim or flange 12 of the body or standard 13, and an upper removable or guard member 14 that overlaps at its lower margin the upper margin of the lower bowl part 10 and can be secured thereto by the screws 15.

16 designates, as a whole, the liner, shown best in Fig. 2. It comprises what may be termed a bowl member 17 and a spout member 18. The bottom wall 19 of the bowl member 17 of the liner is inclined relatively to the horizontal and fits closely the upper face of the bottom wall 20 of the metal bowl. The sides of the bowl member likewise fit closely against the inner side face of the metal bowl 10. The spout member 18 of the liner is shown as of general channel cross-section, with its bottom wall 21 conforming to the upper face of the bottom of the metal spout of the bowl, and with its upstanding flanges 22 lying close against the inner faces of the side walls of said spout.

The liner is also provided near its center with an upstanding tubular portion 23 which surrounds and closely fits on the guard member 24 that constitutes part of the bottom of the bowl, and through which extends the shaft 25 of the rotary extractor 26, both of which latter are indicated in dotted lines. The upper edge of the tubular portion 23 may be turned inwardly to form a rim or flange 27 to engage over the upper edge of the guard 24.

The upper edge of the bowl portion may be made to fit in abutting relation to the lower edge of the guard portion of the metal bowl. As herein shown, however, the upper margin of said bowl portion of the liner extends beyond the lower marginal part of the guard portion of the bowl and is confined between said guard portion and the main bowl body below the attaching screws 15. The extension of the upper margin of the bowl portion of the liner behind the lower marginal portion of the guard member 14 when the form shown in Figures 1 and 2 is used, prevents the juices which flow down from the upper part of the bowl entering between the upper edge of the liner and the bowl and finding its way to the metallic face of the bowl.

The liner may, however, be extended upwardly farther than shown in Figures 1 and 2 of the drawings, as shown in Figure 3, wherein said liner 28 has an extension 29 which extends above the parting line of the bowl members 10 and 14 and has an inturned part 30 which follows the inner face of the inturned top guard 31 of the bowl. By carrying the liner edge so as to be coincident with the rim of the guard, the juice is prevented from finding its way between the liner and guard.

From what has been said, it is clear that I have provided an extremely economical liner adapted to line and protect the metal wall of the bowl, and that the use of said liner is sanitary and prevents contamination of the fruit juices with parts of the bowl which, in prior constructions, have been carried off with the fruit juices. Moreover, the use of the liner shown conduces to a more sanitary operation of the fruit extractor, inasmuch as the liner can be readily removed and without danger of breaking any of the parts.

I claim as my invention:

1. In a citrus fruit juice extractor, the combination of a metal bowl having horizontally and laterally curved walls, a bottom inclined to the horizontal, a spout extending through said walls below said bottom, and a lining for said bowl conforming substantially to the shape thereof, said lining being formed of paper treated to prevent passage of moisture and an open cover carried by said bowl retaining said lining in said bowl.

2. In a citrus fruit juice extractor, the combination of a metal bowl having horizontally and laterally curved walls, a bottom inclined to the horizontal, a spout extending through said walls below said bottom, and a lining for said bowl conforming substantially to the shape thereof, said lining being formed of paper treated to prevent passage of moisture, said lining having an inwardly extending and downwardly curved flange at the top, and an open cover having a similar flange, adapted to fit closely about said lining and retain the same in said bowl.

In witness whereof I claim the foregoing as my invention, I hereunto append my signature this 10th day of November, 1923.

ARTHUR TODD PURSELL.